(12) United States Patent
Liang et al.

(10) Patent No.: US 9,067,600 B2
(45) Date of Patent: Jun. 30, 2015

(54) ENGINE SPEED CONTROL APPARATUS AND METHOD FOR A HYBRID VEHICLE

(71) Applicant: FORD GLOBAL TECHNOLOGIES, LLC, Dearborn, MI (US)

(72) Inventors: Wei Liang, Farmington Hills, MI (US); Carol Louise Okubo, Belleville, MI (US); Thomas Chrostowski, Chesterfield, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/951,627

(22) Filed: Jul. 26, 2013

(65) Prior Publication Data

US 2015/0032309 A1 Jan. 29, 2015

(51) Int. Cl.
*B60W 20/00* (2006.01)
(52) U.S. Cl.
CPC ............. *B60W 20/40* (2013.01); *Y10S 903/902* (2013.01)
(58) Field of Classification Search
CPC ... F16H 57/0006; B60W 30/20; B60W 20/00; B60W 10/08; B60W 2510/104; B60W 2710/083; H02K 5/24

USPC .......... 701/22, 51, 111; 477/3, 200; 180/65.265, 65.285, 65.21, 65.28; 903/906, 907; 192/124, 70.17

See application file for complete search history.

(56) References Cited

U.S. PATENT DOCUMENTS

| | | | |
|---|---|---|---|
| 4,980,621 A * | 12/1990 | Muller | 318/269 |
| 6,278,195 B1 | 8/2001 | Yamaguchi et al. | |
| 6,877,575 B2 | 4/2005 | McCarthy | |
| 8,140,230 B2 | 3/2012 | Haggerty et al. | |
| 8,226,525 B2 | 7/2012 | Swales et al. | |
| 2003/0125850 A1* | 7/2003 | Evans et al. | 701/22 |
| 2010/0148714 A1* | 6/2010 | Okita et al. | 318/561 |
| 2012/0065821 A1 | 3/2012 | Hessell et al. | |
| 2013/0234642 A1* | 9/2013 | Igarashi et al. | 318/611 |

FOREIGN PATENT DOCUMENTS

| | | | | |
|---|---|---|---|---|
| JP | 2004274976 | * | 9/2004 | H02P 5/00 |
| JP | 2009013925 A | * | 1/2009 | |

* cited by examiner

*Primary Examiner* — Marthe Marc-Coleman
(74) *Attorney, Agent, or Firm* — David B. Kelly; Brooks Kushman P.C.

(57) ABSTRACT

A vehicle powertrain system has an engine, a damper and an electric machine configured to be selectively mechanically coupled with the engine via damper. The vehicle powertrain system also has at least one controller programmed to filter a frequency content of a speed or torque command for the electric machine corresponding to a resonant frequency of the engine, damper and electric machine to reduce resonance of the engine, damper and electric machine.

12 Claims, 7 Drawing Sheets

ENGINE SPEED CONTROL APPARATUS AND METHOD FOR A HYBRID VEHICLE

TECHNICAL FIELD

The present disclosure relates to a control apparatus and method for an engine on a hybrid vehicle, and specifically to an apparatus and method for cancelling engine torque pulses.

BACKGROUND

Hybrid Electric Vehicles (HEV) are featured with an internal combustion engine and electric machines driven by state-of-art inverter systems. A high voltage battery is used in the electrified powertrain to supply power to the electric machines and to store energy recuperated during vehicle brake. The electric motor/generator(s) within a hybrid electric vehicle provides the vehicle with additional degrees of freedom in delivering the driver-demanded torque and may also be used to control the output speed of the engine. Three common HEV configurations are typically used in automotive industry, which are power split, series hybrid and parallel hybrid.

In the power split type hybrid electric vehicle, the electric generator and the internal combustion engine are interconnected by use of a planetary gear set, and the electric generator selectively provides a reaction torque which may be used to control (e.g., to reduce and/or augment) the speed of the vehicle's engine. In this manner, the generator is used to control the speed of the engine and cooperates with the planetary gear set and a traction motor to provide a continuous variable transmission ("CVT") effect. One drawback associated with this type of hybrid electric vehicle arises from the limited amount of reaction torque which can be provided by the motor/generator.

The mechanical structure between the engine and the electric machine may become a mechanically constitute vibrating system during certain vehicle speeds. When the engine is an internal combustion engine, for example, a torque variation due to a gas explosion or reciprocating motions of the piston in the internal combustion engine causes torsional vibrations on the output shaft of the internal combustion engine and the rotating shaft of the motor. When the natural frequency of the shaft coincides with the forcible frequency, a resonance occurs. This may result in a foreign noise from the shaft and even fatigue destruction of the shaft in some cases. Such a resonance occurs in many cases at a revolving speed lower than the minimum of an operable revolving speed range of the engine, although it depends upon the type of the engine and the structure of the shaft.

The resonance of the torsional vibrations that may occur in the system at the time of starting or stopping the operation of the engine is observed not only in the power output apparatus but in any driving system, wherein the output shaft of the engine and the rotating shaft of the motor are mechanically linked with each other. The primary countermeasure against these troubles is that the output shaft of the engine and the rotating shaft of the motor are mechanically linked with each other via a damper. The dampers having a significant effect on reduction of the amplitude of the torsional vibrations, however, require a special damping mechanism. This increases the required number of parts and makes the damper undesirably bulky. The small-sized simply-structured dampers, on the other hand, have little effects.

The motor is generally under a proportional and integral gain (PI) control. In the procedure of outputting a torque from the motor to the output shaft of the engine and thereby positively stopping the operation of the engine, the I term (integral term) may result in undershooting the output shaft of the engine, which causes a vibration of the whole driving system. When the driving system is mounted, for example, on a vehicle, the vibration due to undershooting is transmitted to the vehicle body and makes the driver uncomfortable.

In general, the classical method to control hybrid electric vehicle speed control between the engine and electric machine may be done using one or more algorithms used to control the inertia of the engine and generator/motor by controlling the engine speed and/or the generator/motor speed. If any speed control happens to excite such a resonance between the engine and electric machine, serious speed and torque oscillation may be observed on the system. An improper hybrid electric speed control design may lead to engine speed/torque oscillation in classic engine speed control for HEV applications.

SUMMARY

In a first illustrative embodiment, a vehicle comprises an engine, a damper, an electric machine configured to be selectively mechanically coupled with the engine via the damper, and at least one controller. The controller may be programmed and configured to filter a frequency content of a speed or torque command for the electric machine corresponding to a resonant frequency of the powertrain system including, but not limited to, the interaction between the engine, damper and electric machine. Based on the target speed, the controller may filter a frequency content of the speed or torque command for the electric machine to reduce resonance of the engine, damper and electric machine.

In a second illustrative embodiment, a method for a powertrain system to respond to a speed or torque command while taking into consideration the reduction of resonant frequency by filtering the command values that may cause vibration on the powertrain system. The powertrain system may include, but is not limited to, an engine, damper, an electric machine and at least one controller. The powertrain system, in response to a speed or torque command for an electric machine, may filter a frequency content of the command corresponding to a resonant frequency of an engine, damper and an electric machine to reduce vibration of the powertrain system while the electric machine responds to the command.

In a third illustrative embodiment, a vehicle comprises a powertrain system including an engine, a damper, and an electric machine mechanically coupled with the engine via the damper, and at least one controller. The controller may be configured and programmed to filter a frequency content of a speed or torque command for the electric machine corresponding to a resonant frequency of the powertrain system. The filter may reduce vibration of the powertrain system while the electric machine responds to the speed or torque command.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
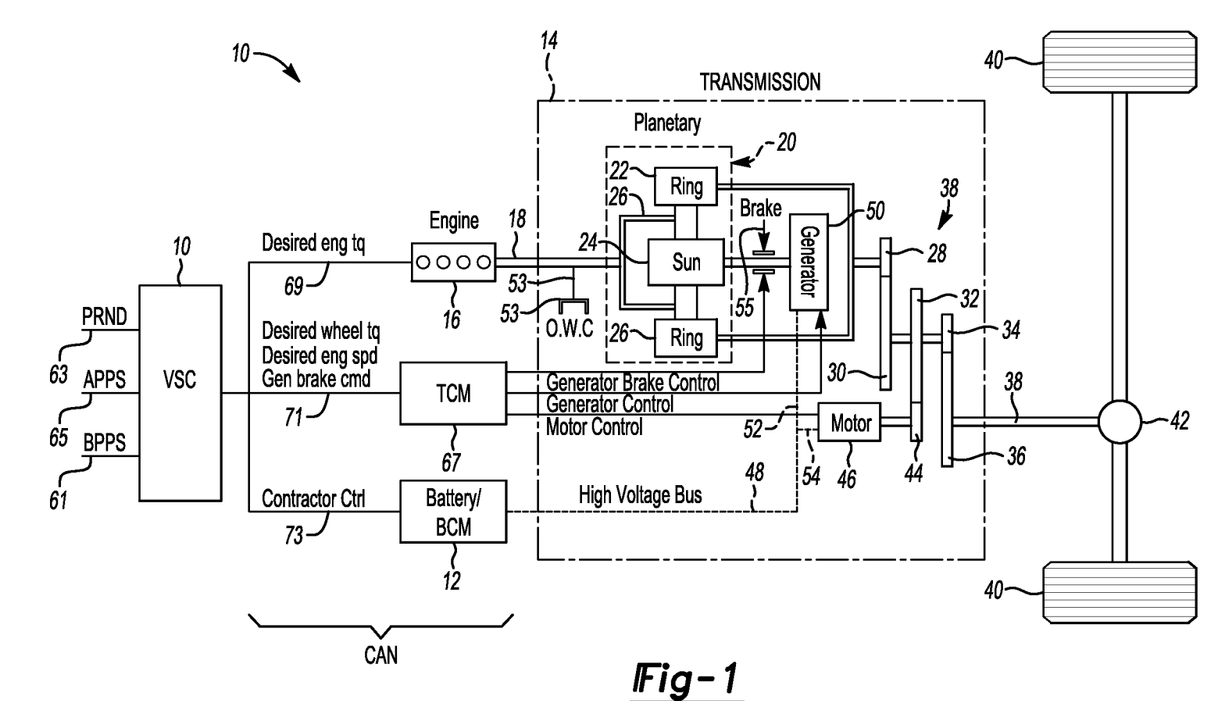
FIG. 1 is a schematic illustration of a power split hybrid electric vehicle powertrain system.

The disclosed hybrid electric vehicle powertrain has a parallel-series configuration, as shown in FIG. 1. A vehicle system controller 10, a battery 12 and a transaxle 14, together with a motor-generator subsystem, are under control of a control area network (CAN). An engine 16, controlled by module 10, distributes torque through torque input shaft 18 to transmission 14.

The transmission 14 includes a planetary gear unit 20, which comprises a ring gear 22, a sun gear 24, and a planetary carrier assembly 26. The ring gear 22 distributes torque to step ratio gears comprising meshing gear elements 28, 30, 32, 34 and 36. A torque output shaft 38 for the transaxle is drivably connected to vehicle traction wheels 40 through a differential and axle mechanism 42.

Gears 30, 32 and 34 are mounted on a countershaft, the gear 32 engaging a motor-driven gear 44. Electric motor 46 drives gear 44, which acts as a torque input for the countershaft gearing.

The battery delivers electric power to the motor through power flow path 48. Generator 50 is connected electrically to the battery and to the motor in known fashion, as shown at 52.

Some power split systems are equipped with additional clutches or brakes. When the powertrain battery 12 is acting as a sole power source with the engine off, the torque input 18 and the carrier assembly could be braked by an overrunning coupling 53. A mechanical brake 55 could anchor the rotor of generator 50 and the sun gear 24 when the engine is on and the powertrain is in a parallel drive mode, the sun gear 24 acting as a reaction element.

As mentioned previously, there are two power sources for the driveline. The first power source is a combination of the engine and generator subsystems, which are connected together using the planetary gear unit 20. The other power source involves only the electric drive system including the motor, the generator and the battery, where the battery acts as an energy storage medium for the generator and the motor.

Figure 2A:
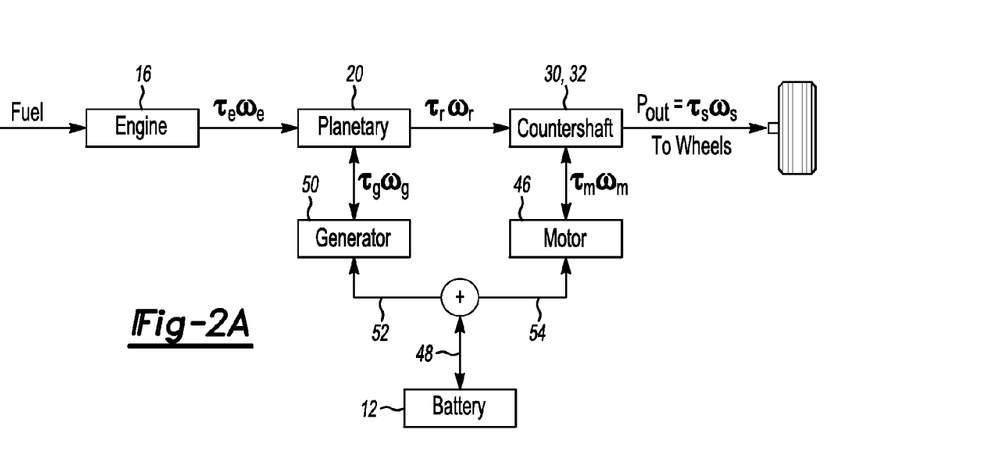
FIG. 2A is a diagram of power flow in a power split hybrid configuration.

The power flow paths between the various elements of the power split powertrain diagram shown in FIG. 1 is illustrated in FIG. 2A. Fuel is delivered to the engine 16 under the control of the operator in known fashion using an engine throttle. Engine power delivered to the planetary gear unit 20 is expressed as $T_e\omega_e$, where $T_e$ is engine torque and $\omega_e$ is engine speed. Power delivered from the planetary ring gear to the countershaft gears is expressed as $T_r\omega_r$, which is the product of ring gear torque and ring gear speed. Power out from the transmission 14 is represented by the symbols $T_s$ and $\omega_s$, the torque of shaft 38 and the speed of shaft 38, respectively.

The generator, when it is acting as a motor, can deliver power to the planetary gearing. Alternatively, it can be driven by the planetary gearing, as represented in FIG. 2A by the torque flow path 52. Similarly, power distribution between the motor and the countershaft gears can be distributed in either direction, as shown by the power flow path 54. Driving power from the battery or charging power to the battery is represented by the bi-directional arrow 48.

As shown in FIG. 2A, engine output power can be split into two paths by controlling the generator speed. The mechanical power flow path, $T_r\omega_r$, is from the engine to the carrier to the ring gear to the countershaft. The electrical power flow path is from the engine to the generator to the motor to the countershaft. The engine power is split, whereby the engine speed is disassociated from the vehicle speed during a so-called positive split mode of operation. The positive split operation is where the engine 16 delivers power to the planetary gearing 20, which delivers power to the countershaft gears 30, 32 and 34, which in turn drive the wheels. A portion of the planetary gearing power is distributed to the generator 50, which delivers charging power to the battery 12. The speed of the generator at that time is greater than zero or positive, and the generator torque is less than zero. The battery drives the motor 46, which distributes power to the countershaft. This arrangement is a "positive power split".

If the generator, due to the mechanical properties of the planetary gear unit, acts as a power input to the planetary gear unit to drive the vehicle, the operating mode can be referred to as a "negative power split". The negative power spilt is where the generator speed is negative and the generator torque also is negative.

The negative power split allows the generator to deliver power to the planetary gear unit 20 as the motor 46 acts as a generator and the battery 12 is charging. It is possible, however, that under some conditions the motor may distribute power to the countershaft gearing if the resulting torque at the wheels from the gearing does not satisfy the driver demand. Then the motor must make up the difference.

If the generator brake 55 is activated, a parallel operating mode is established. The parallel operating mode is where the engine 16 is on and the generator is braked. The battery 12 powers the motor 46, which powers the countershaft gearing simultaneously with delivery of power from the engine to the planetary gearing to the countershaft gearing.

The first source of power can deliver torque only for forward propulsion because there is no reverse gear in the countershaft gearing. The engine requires either generator control or a generator brake to permit transfer of power to the wheels for forward motion.

The second source of power, as previously described, is the battery, generator and motor subsystem. The electric motor draws power from the battery and effects propulsion independently of the engine, with either forward or reverse motion. The generator may draw power from the battery and drive against a reaction of the one-way coupling 53. The generator in this mode operates as a motor.

As previously indicated, the two power sources are integrated so that they seamlessly work together to meet the driver's demand for power without exceeding the system's power limits, including battery limits, while maintaining optimum powertrain efficiency and performance. The system may determine the driver's demand for torque and achieve the optimum split of power between the two power sources. If the battery limits are exceeded and the battery voltage is outside of a specified range, powertrain system shutdown may occur.

In the power split hybrid configuration, the planetary gear set has two degree-of-freedom so it may allow the engine speed to be regulated to any value by the generator for any given vehicle speed. During all normal operation, the generator controls the engine speed to an optimal speed set point for maximum system efficiency.

The speed relationship between the engine and the generator has the form:

$$\omega_g = r_3\omega_e - r_1\omega_m \quad (1)$$

where gear ratios $$r_1 = \frac{\rho_{m2r}}{\rho},$$

$r_3 = \rho_{c2s}$, and wherein $\rho$ is the planetary gear ratio.

Figure 2B:
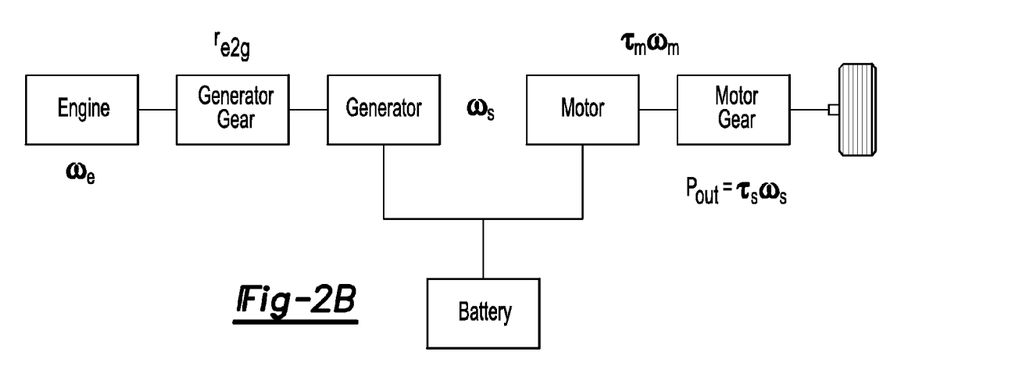
FIG. 2B is a diagram of a series hybrid configuration.

As shown in FIG. 2B, a series HEV configuration may have two electric machines with a different layout from the power split design. The engine is connected to the generator only to generate electricity. The traction motor drives the vehicle all the time using the power provided by the battery and the generator. The generator also serves as the controller of the engine speed. The speed relationship between the engine and the generator in a series configuration is simpler than the one of power split with the following form:

$$\omega_2 = r_{e2g}\omega_g \quad (2)$$

where $r_{e2g}$ is the gear ratio between the engine and the generator.

Figure 2C:
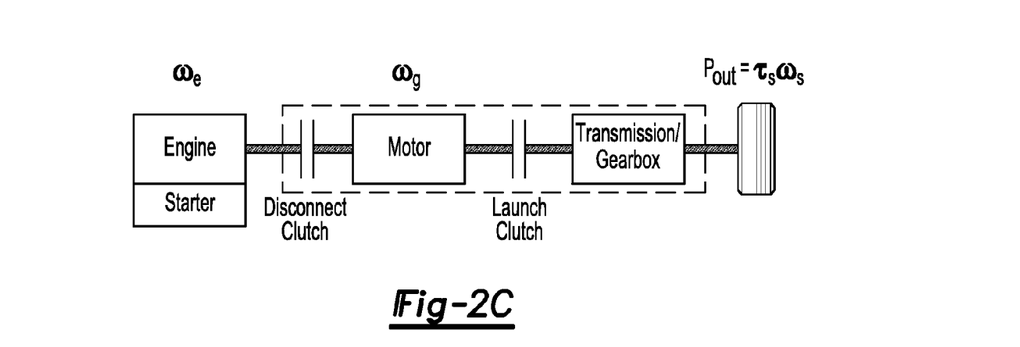
FIG. 2C is a diagram of a pre-transmission parallel hybrid configuration.

As shown in FIG. 2C, multiple configurations of parallel HEVs exist but the most common choice is the pre-transmission motor parallel hybrid. The normal step ratio transmission is used in the powertrain to multiply torque output and provide multiple speed ratios between the engine and the vehicle. The "sandwich" type motor is mounted between the engine and the transmission input, as shown in FIG. 2C. The transmission can use either a conventional torque converter (not shown in FIG. 2C) or a launch clutch used to connect the motor to the transmission input. The engine can be connected and disconnected from the motor by the disconnect clutch.

The speed relationship between the engine and the motor is the simplest among all these configurations. It takes the form (when the disconnect clutch is closed):

$$\omega_e = \omega_g \quad (3)$$

One feature shared by all HEV configurations, including but not limited to the three discussed herein, is the mechanism of engine speed regulation using an electric machine. For power split and series HEVs, the engine speed is regulated by the generator during all normal operations when the engine is on. For parallel hybrid, the engine speed is regulated by the motor when they are in speed control mode (i.e., mainly in Park and Neutral, or coast down operation in gear). Therefore, engine speed control algorithms are essential functions including, but not limited to, all three HEV configurations discussed.

In response to operator input, as captured by one or more controller modules in communication with each other, the supervisory control module may determine required torque output. The one or more controller modules may include, but is not limited to, Engine Control Module (ECM), Transmission Control Module (TCM), Hybrid Control Module (HCM), Battery Pack Control Module (BPCM), and/or a Transmission Power Inverter Module (TPIM). Selectively operated components of the hybrid powertrain system are appropriately controlled and manipulated to respond to the operator demand. For example, when the operator has selected a forward drive range and manipulates either the accelerator pedal or the brake pedal, the hybrid powertrain determines an output torque for the transmission, which affects how and when the vehicle accelerates or decelerates. Final vehicle acceleration is affected by other variables, including such factors as road load, road grade, and vehicle mass. The one or more control modules within a HEV powertrain system monitors the parametric states of the torque-generative devices, and determines the output of the transmission required to arrive at the desired torque output. Under the direction of the one or more control modules, the transmission operates over a range of output speeds from slow to fast in order to meet the operator demand.

In the embodiments depicted above, the engine may be any of numerous forms of reciprocating-piston type internal combustion engines, such as a spark-ignited gasoline engine or a compression-ignited diesel engine, readily adaptable to provide its available power to the transmission at a range of operating speeds, for example, from idle, at or near 600 revolutions per minute (RPM), to over 6,000 RPM. Irrespective of the means by which the engine is connected to the input shaft of the transmission, the input shaft is connected to a gear set in communication with an electric machine that may include a generator and/or motor.

During operation in an HEV powertrain system, the vehicle may be adversely affected by torque oscillations that occur when abrupt torque changes are encountered in the operation of one or a combination of a transmission, engine, and motor/generators. Such oscillations are encountered, for example, during launching, shifting, and mode changes including engine start and stop. The damping of such torque oscillations may enhance vehicle drivability and performance, increase operational life expectancy of the powertrain, and improve operator satisfaction. Coordinated control of the torque-generative device, i.e., engine and/or electric machine(s), may be used to provide such damping.

Figure 3:
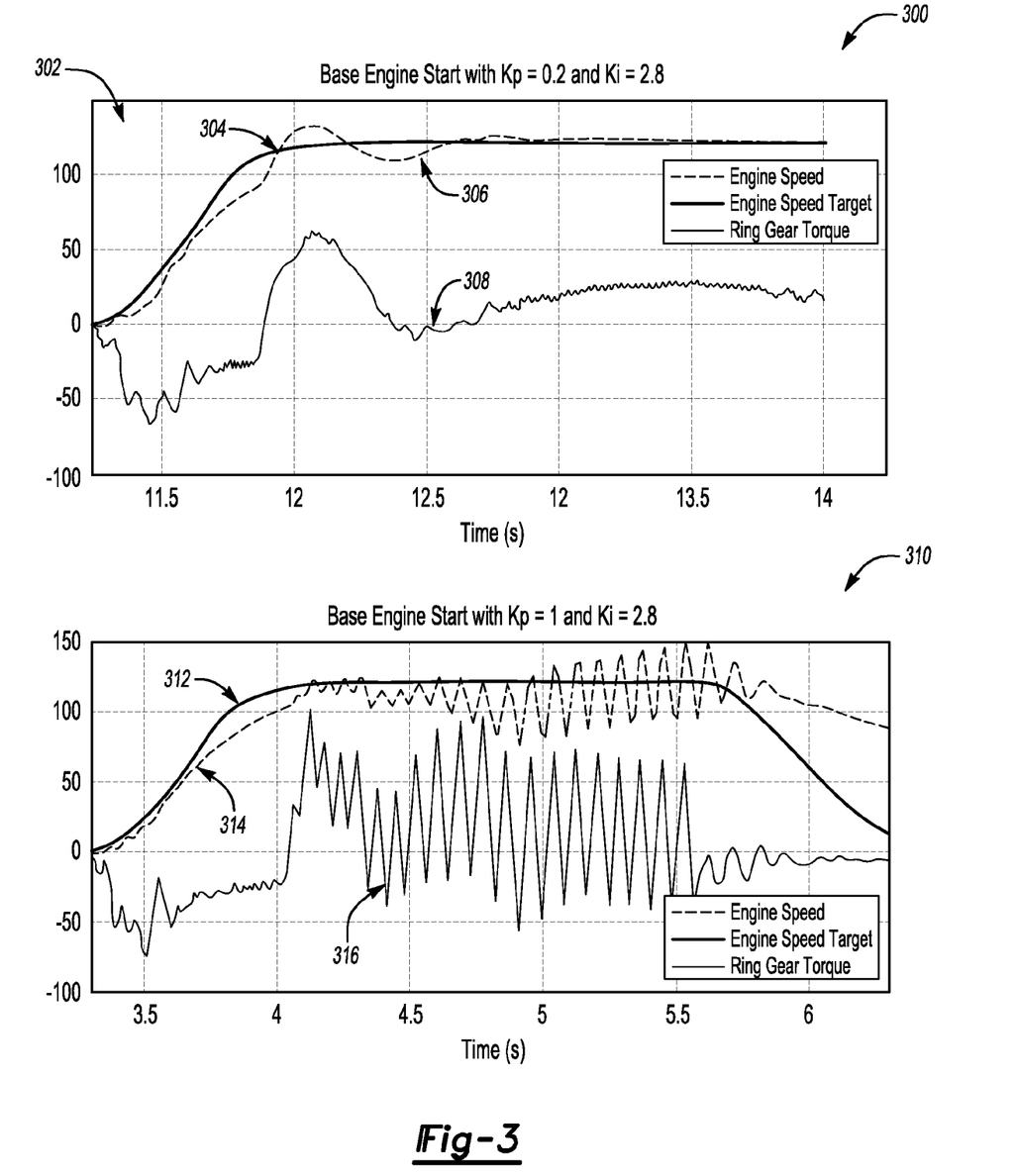
FIG. 3 are graphs representing resonance between an engine and an electric machine in a HEV powertrain system.

FIG. 3 are graphs representing resonance between an engine and an electric machine in a HEV powertrain system. To eliminate resonance of engine torque ripple between an engine and an electric machine, a mechanical damper may be used in every engine of a HEV powertrain system regardless of the configuration. The mechanical damper allows a relative angular displacement between the engine crankshaft and the electric machine. During engine mode changes the engine speed may be different from the electric machine speed multiplied by the gear ratio. The resonance is determined by the damper stiffness and the electric machine inertia. Such resonance may be found in each mechanical design of an HEV powertrain system. If any speed control excites the resonance of the HEV powertrain system, speed oscillations and/or torque oscillations may be observed on the system as detailed in the resonance graphs 300.

The classical method to model the engine and electric machine speed relationship is given by the following differential equation in the form:

$$J_e\dot{\omega}_e + rJ_g\dot{\omega}_g = \tau_e + r\tau_g \quad (4)$$

where $J_e$ and $J_g$ are the inertia of the engine and the generator(motor in the case of parallel HEV), $\tau_e$ and $\tau_g$ are the torque of the engine and the generator. The variable r in the differential equation is the gear ratio between the engine and the generator (or the motor in the case of parallel HEV). The engine and electric machine speed as shown in equation (4) can be applied to all several types of HEV configurations when the corresponding speed relationships in equation (1)-(3) are used. Therefore, the speed control problem in all three HEV configurations disclosed may be formulated by a similar control algorithm. The power split may be the most complex configuration for speed control. It may be used as an illustrative example to describe an improved control algorithm to reduce powertrain system oscillation. However, the algorithm may be applied to engine speed control problems of multiple types of powertrain and HEV powertrain systems.

Other hardware implementations have been developed to control resonance in powertrain systems including, a damper by-pass clutch. The damper by-pass clutch temporarily bypasses the damper and connects the engine and one electric machine directly. This implementation may remove system resonance introduced by the mechanical damper but requires more hardware and complex control support to drive the damper by-pass clutch.

Software solutions have also been developed using a proportional-integral (PI) algorithm speed control, however engine speed and ring gear torque ripple may continue to occur as shown in graph 300. A PI control is used in the closed loop to regulate the electric machine speed to the target using a transfer function of the electric machine speed control:

$$\tau_g = \left(K_p + \frac{K_i}{s}\right)(\omega_s^r - \omega_g) \quad (5)$$

The engine speed may be requested to a value that correlates with one or more factors including, but not limited to, vehicle speed, driver accelerator pedal request, and/or battery charge level; while the electric machine is being targeted using the above speed control function.

It is found that the closed loop property based on the model (4) has two characteristics including a dynamic system that may always be stable when the proportional gain (Kp) and the integral gain (Ki) are both positive, and when Ki determines the closed loop bandwidth while Kp determines the closed loop damping. Such a control algorithm is effective in most engine operation but has certain challenges during transient operations. One of the known challenges on the system may include, but is not limited to, engine speed oscillations in the HEV powertrain system when a high Kp value is used.

For example, when a low Kp value is used, as show in diagram 302, the engine speed 306 slowly responds to the targeted engine speed 304. The low Kp value diagram 302 illustrates the control algorithm having a slow response time to the targeted engine speed while the powertrain system torque 308 has little resonance.

Another example is a high Kp value, as shown in diagram 310, is used that excites the HEV powertrain system to create the same frequency of speed oscillations that may be seen by the powertrain system receiving a low power limit wide open pedal request scenario. The high Kp value allows the engine speed 314 to respond faster and follow the targeted engine speed 312, however the fast transition may cause oscillation as show in the diagram by the torque 316 resonance.

$$\tau_g = \frac{(k_p s + k_i)s}{s^2 + \frac{k_p}{j}s + \frac{k_i}{j}}\omega_g^r - \frac{1}{r_3 J}\frac{k_p s + k_i}{s^2 + \frac{k_p}{j}s + \frac{k_i}{j}}\frac{\tau_g^r}{T_g s + 1} \quad (6)$$

Figure 4A:
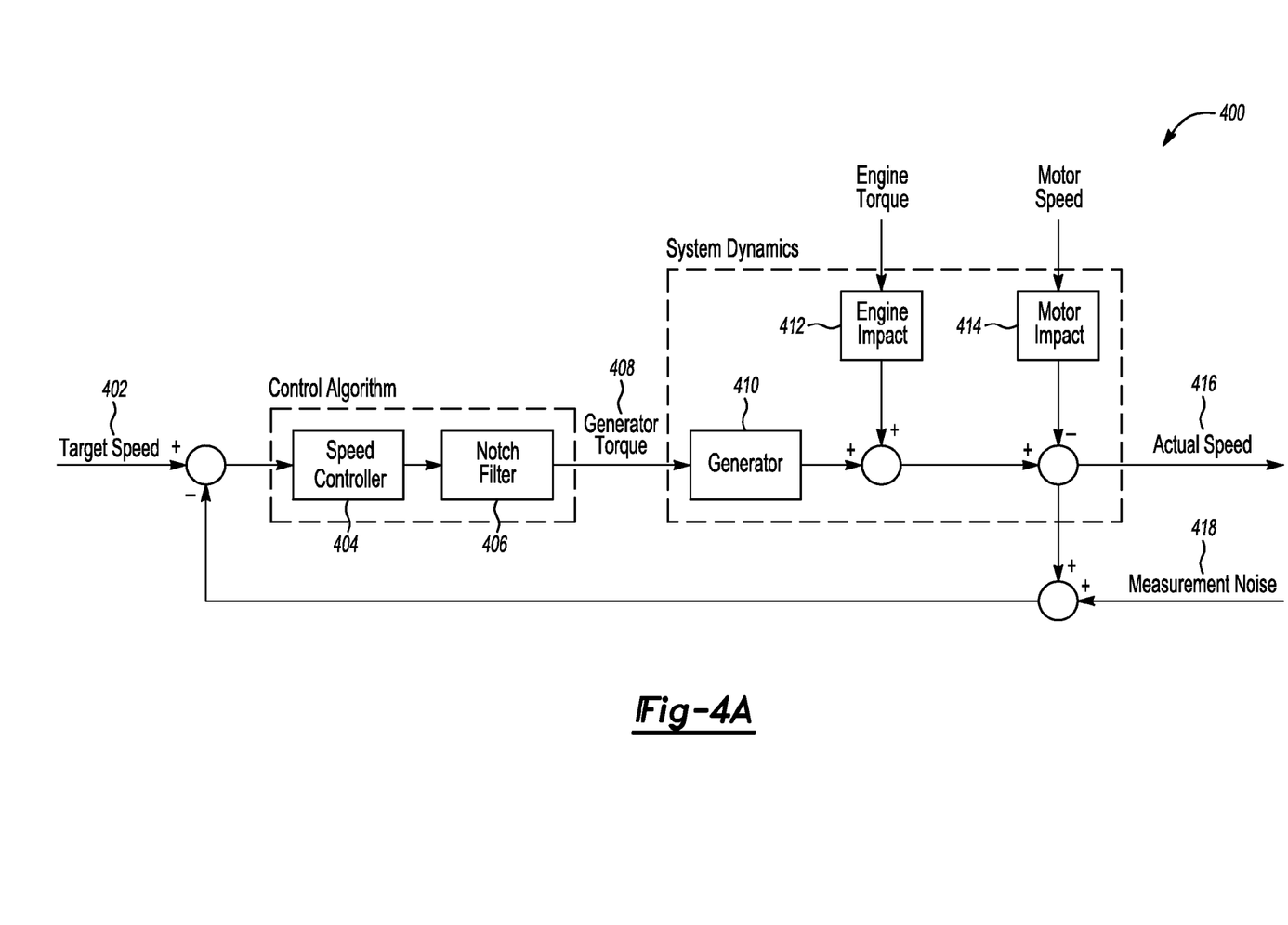
FIG. 4A is a control system diagram of a damp out resonant oscillation in a hybrid electric vehicle powertrain system.

FIG. 4A is a control system diagram of a damp out resonant oscillation in a hybrid electric vehicle powertrain system. The control system includes an algorithm for multivariate active driveline damping to improve regulating active damping in a vehicle powertrain. The control method is described herein with respect to the structures illustrated in FIGS. 1, 2A, 2B, and 2C, preferably executed as algorithms in one or more controllers of the powertrain control system. However, the present disclosure may also be incorporated into other vehicle powertrain configurations, and applied to other powertrain arrangements.

The following control system diagram 400 of the damp out resonant oscillation is an improved speed control algorithm that may effectively damp out the resonant oscillation by applying a feedback speed controller 404 and a notch or lead filter 406 with a PI control algorithm loop designed to remove the resonance in the HEV powertrain system. The notch filter or lead filter 406 is designed to remove the resonance, while the feedback speed controller 404 may be similar to the equation (5). The notch or lead filter may be placed before or after the speed control calculation, and it not limited to the sequence it is depicted in the control system diagram 400.

A target speed 402 may be calculated, determined, and/or generated by one or more inputs including, but not limited to, current vehicle speed, operator request, vehicle sensors, and/or a request by one or more powertrain systems. In operation, the target speed 402 is received by the control algorithm and is compared to the actual speed including, but not limited to, measured noise of the HEV powertrain system.

The speed controller 404 receives the target speed and calculates the electric machine torque by using a proportional and integral gain function multiplied by the difference in the targeted electric machine speed to the current electrical machine speed as shown in equation (5). The lead filter 406 receives the electric machine speed controller output value and removes the resonance frequency from the electric machine speed controller output value.

In another embodiment, the notch or lead filter may filter the target speed calculation to remove the resonant frequency and transmit the filtered speed calculation value to the speed controller. The notch or lead filter may filter the received outputs from the speed controller, or filter the target speed and transmit the filtered target speed value to the speed controller.

The lead filter 406 may include one or more types of lead filters, it could be one second order lead filter or one higher order lead filter. For example, a second order lead filter may include the following equation:

$$= \frac{s^2 + 2\zeta_2 \omega_{n2} s + \omega_{n2}^2}{s^2 + 2\beta \omega_{n2} s + \omega_{n2}^2} \quad (7)$$

The numerator is selected to have the same zero location with the open loop poles of the damper. The natural frequency $\omega_{n2}$ and the damping ratio $\zeta_2$ are selected to match the resonance behavior shown in FIG. 3. $\beta$ is the damping ratio of the introduced poles. The following condition has to be true for the parameter design in (7)

$$\beta \gg \zeta_2 \quad (8)$$

To implement the designed filter, first it has to be converted to a transfer function in z-domain, which has the form:

$$G_{ll} = \frac{b_0 + b_1 z^1 + b_2 z^2}{1 + a_1 z^{-1} + a_2 z^2} \quad (9)$$

where

-continued $$b'_0 = 4 + 4\zeta_2\omega_{n2}T_s + \omega_{n2}^2 T_s^2$$
$$b'_1 = -8 + 2\omega_n^2 T_s^2$$
$$b'_2 = 4 - 4\zeta_2\omega_n T_s + \omega_n^2 T_s^2$$
$$a'_0 = 4 + 4\beta\omega_n T_s + \omega_n^2 T_s^2$$
$$a'_1 = -8 + 2\omega_n^2 T_s^2$$
$$a'_2 = 4 - 4\beta\omega_n T_s + \omega_n^2 T_s^2$$

(10)

and the normalized ai and bi take the form $$a_i = \frac{a'_i}{a_0}, \ b_i = \frac{b'_i}{a_0}$$

(11)

The generator torque may take the form:

$$\tau_g(k) = -a_1\tau_g(k-1) a_2\tau_g(k-2) + p_0\tau_g^{PI}(k) + b_1\tau_g^{PI}(k-1) + b_2\tau_g^{PI}(k-2)$$

(12)

where $\tau_g^{PI}$ is the torque output of the PI control in equation (5).

In one embodiment, the filtered electric machine torque value 408 may be sent to the generator 410. The control algorithm may continue to monitor the system dynamics by comparing the generator 410 speed to the engine impact 412 speed. The output value of generator speed and engine impact torque is offset by the motor 414 torque to produce the actual speed 416 in the HEV powertrain system. The control system continuously monitors the actual speed of the powertrain system while measuring noise 418 to provide a closed loop control for calculating the generator torque. The control system may receive feedback from a speed sensor on the generator when determining torque control of the requested targeted generator speed.

Figure 4B:
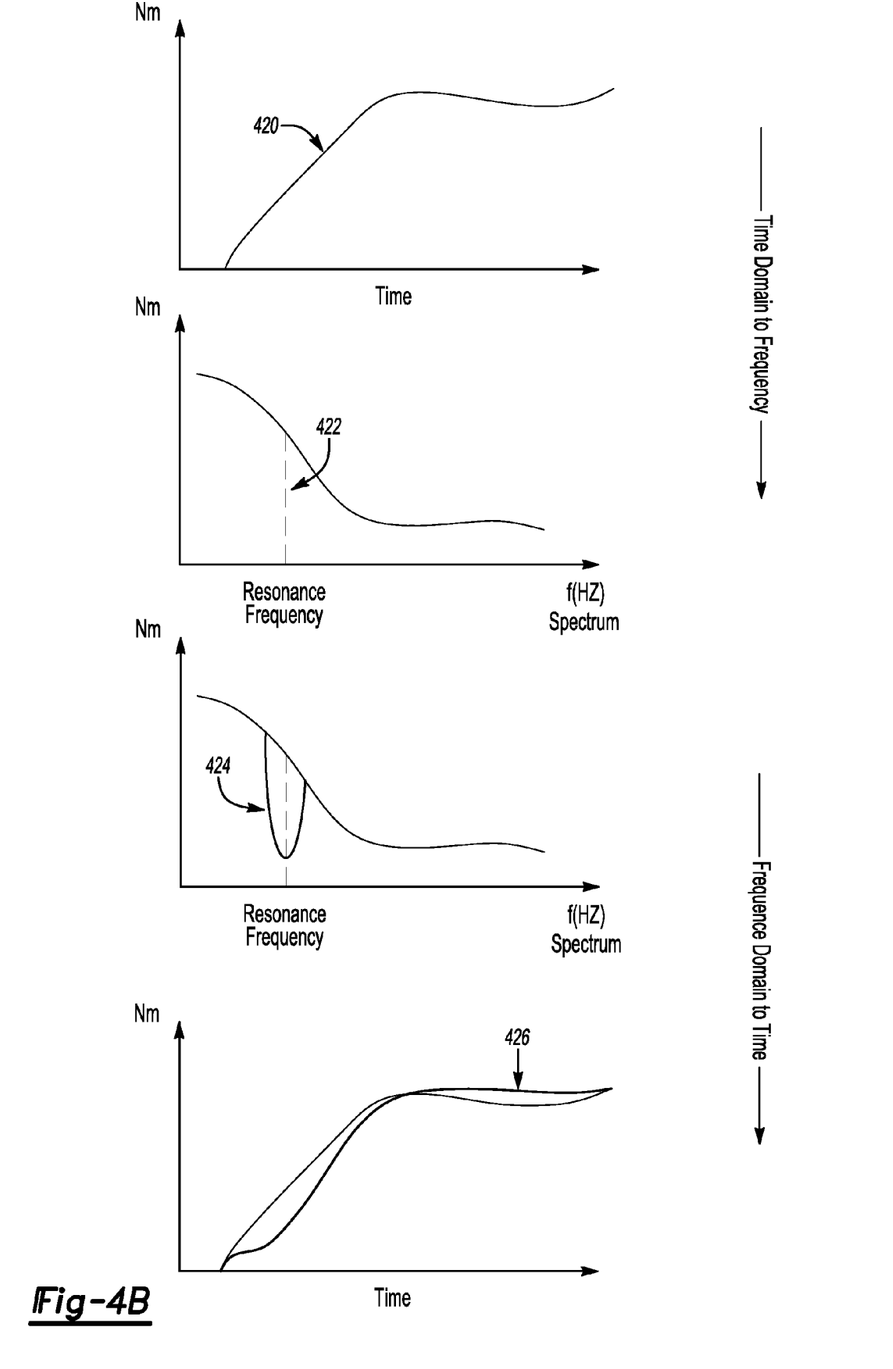
FIG. 4B is a set of graphs representing the control system filtering a frequency content of a resonant oscillation in a powertrain system.

FIG. 4B is a set of graphs representing the control system filtering a frequency content of a resonant oscillation in a powertrain system. The targeted torque being calculated by the powertrain system in reference to time is represented on the graph as line 420. The powertrain system may have a resonant frequency at a certain targeted torque value as represented in line 422. For example, during development and calibration of the powertrain system, a resonant frequency may be identified at one or more targeted torque values in the system. Once the one or more targeted torque values are identified, the notch filter may be applied at that torque value to reduce or eliminate the resonant oscillation as represented by line 424.

After the one or more resonant frequency(s) are discovered, and the notch filter applied to the identified frequency, the actual torque produced by the system may have reduced and/or eliminated oscillation in the powertrain system as represented by line 426. The notch filter may be applied to one or more resonant occurrences for filtering a frequency content while improving engine speed or torque oscillation in the powertrain system.

Figure 6:
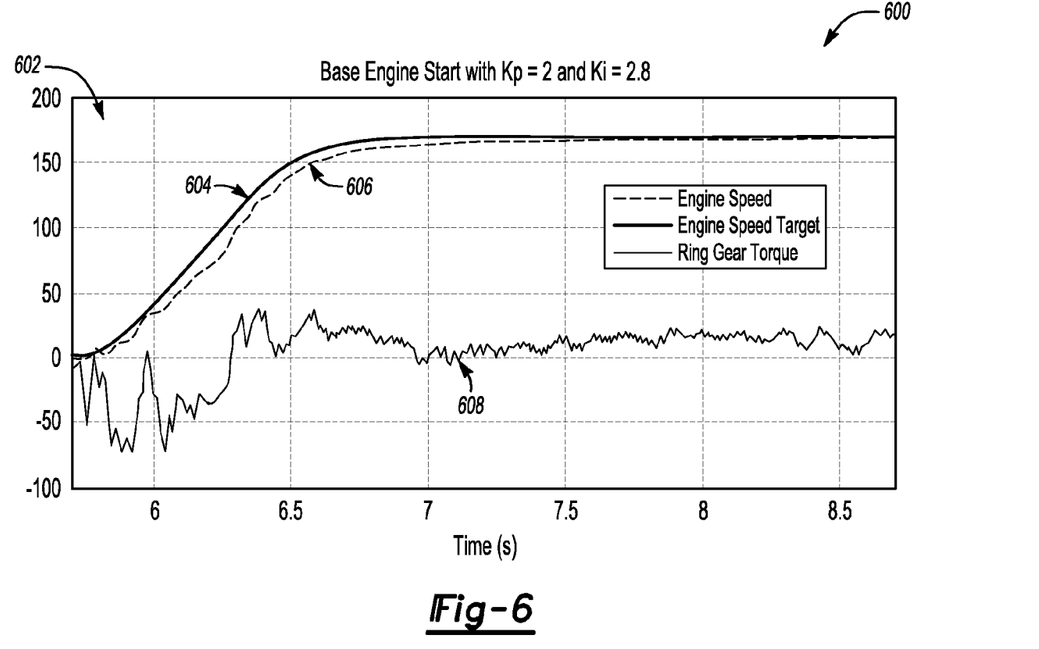
FIG. 6 illustrates a graph with a filter being implemented in a control algorithm to reduce resonance in a powertrain system.

The system speed behavior using the proposed control (12) is shown in FIG. 6. The graph in FIG. 6 shows the engine speed has very good following to the command when a high proportional gain is used without creating a resonant oscillation as found in the base control. The design parameter β can be used by calibrators to tune the magnitude of the damping effect in the case of a second order notch filter. The balance of an effective damping at resonance frequency and small impact at low frequency range is the target of the calibration.

Figure 5:
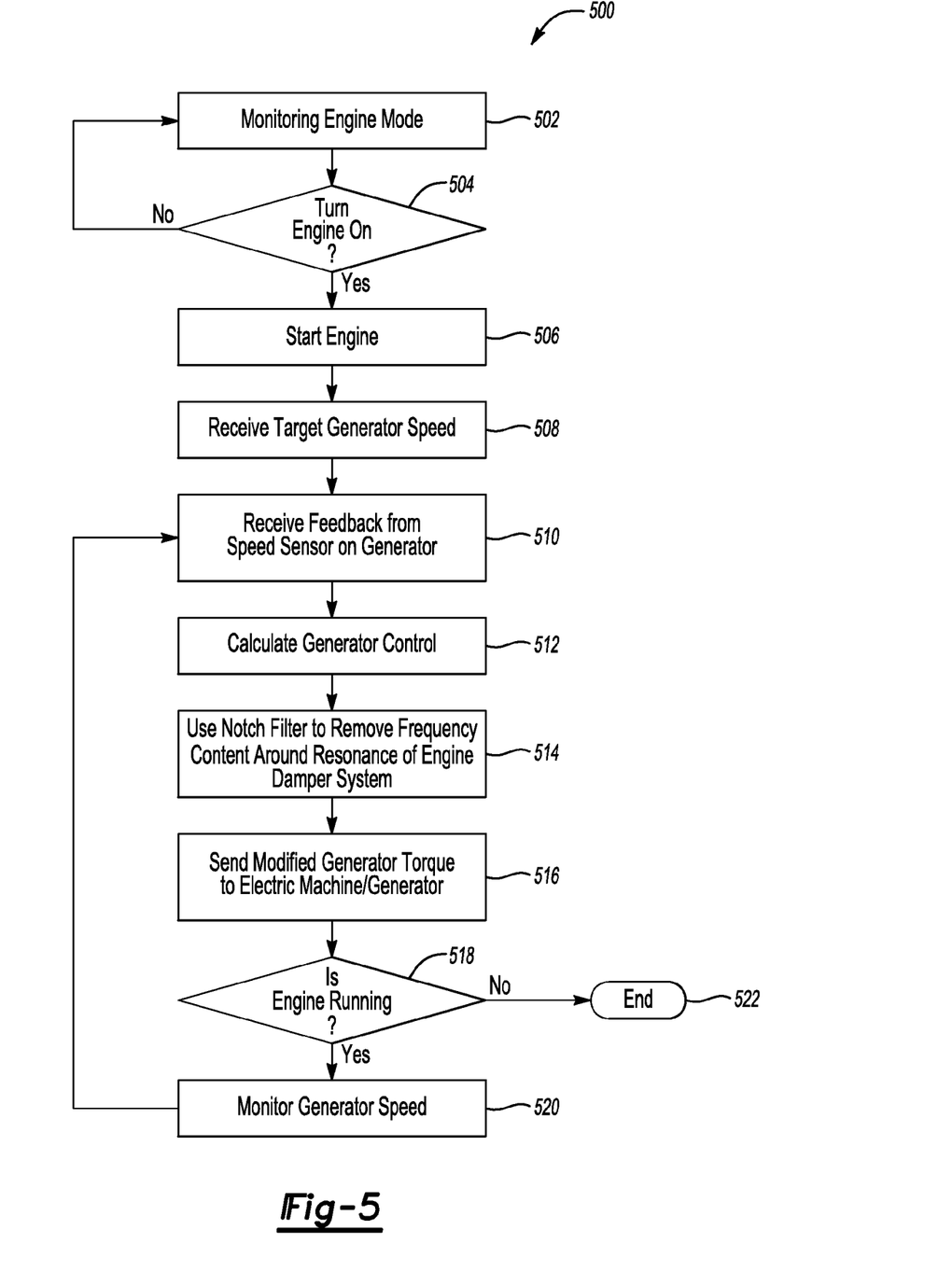
FIG. 5 is a flow chart for the control method of damping out resonant oscillation in a powertrain system.

FIG. 5 is a flow chart for the control method of damping out resonant oscillation in a powertrain system. In addition, it is within the scope and spirit of the present invention to omit steps, include additional steps, and/or modify the order presented in FIG. 5. It may be further noted that the method 500 represents a single operation, however, it is expected, as indicated above, that the method 500 be applied in a systematic and repetitive manner.

The control method 500 can be programmed as a computer-executable set of instructions or code, and stored on a tangible/non-transitory computer-readable medium or distributed media. Such instructions or code can then be selectively executed by associated hardware components of a controller. The controller may be a single controller device or a distributed networked control device that is electrically connected to or otherwise place in electrical communication with the powertrain system including, but not limited to, an engine, generator, electric motor, and the transmission via suitable control channels. The control channels may include any required transfer conductors providing a hard-wired or wireless control link suitable for transmitting and receiving the necessary electrical control signals for proper power flow control and coordination aboard the vehicle.

At step 502, the control method may be monitoring engine mode to determine whether the engine is being requested on or off in a hybrid electric vehicle. The engine mode determination factors may include, but is not limited to, vehicle speed, battery charge status, the amount of torque being requested by a vehicle operator, and/or the amount of torque being request by one or more powertrain systems in the HEV. Based on the one or more determinations, the powertrain system may turn the engine on or off at step 504.

In one embodiment, the engine may be off and the powertrain system may receive a request to turn engine on while monitoring engine mode. At step 506, the powertrain system may start the engine based on the one or more determination factors. Once the engine is started, the control method may receive the target generator speed at step 508. The target generator speed may be received from one or more powertrain system control modules based on one or more vehicle sensors, calibrations, engine analysis, and/or vehicle speed. Speed measurement of the electric machine is much more accurate than the measurement of engine speed; therefore the control method may receive powertrain system speed feedback from the speed sensor on the generator at step 510.

At step 512, the control method may calculate generator control using proportional-integral (PI) control logic. Once the control method calculates the PI control for the targeted generator speed, the method may use a notch filter to remove frequency content around resonance of the engine damper system.

At step 516, the method may send the modified generator torque value to the generator, and/or electric machine in one or more other HEV configured powertrain systems. The control method may continue to monitor if the engine is still running at step 518. If the engine is running, the control method may implement a closed loop feedback of generator speed measurement by continuously monitoring generator speed at step 520.

At step 522, if the engine is no longer running, the control method may end until the next engine mode request to turn engine on.

FIG. 6 illustrates a graph with a filter being implemented in a control algorithm to reduce resonance in a powertrain system. The control algorithm operating with a filter, as shown in diagram 600, demonstrates how the filter improves oscillation in a powertrain system while allowing for a high proportional gain to be calibrated without creating a resonant oscillation as found in the base control shown in FIG. 3. The graph 602 illustrates the use of a high proportional gain allowing the system to respond faster to a torque request during one or more powertrain system conditions. The control algorithm with filter diagram 600 depicts a graph that illustrates torque 608, engine speed 604, and targeted engine speed 604. Using a filter, including but not limited to a notch filter, the powertrain system may allow the engine speed 606 to follow the targeted engine speed 604 without causing oscillation in engine speed 604 and/or torque 608. The filter also improves the resonate oscillation throughout the powertrain system.

Reviewing the results in FIG. 6, the filter in the powertrain system allows for a higher proportional gain that may improve powertrain operation in cold temperature, allow for a lower power limit of the electric motor, while eliminating oscillation in the powertrain at one or more system speeds. The control method using a filter, as described in one or embodiments, suppresses resonant frequency corresponding to the engine damper so that the engine speed can be controlled as desired without exciting the resonant oscillation.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   an electric machine mechanically coupled with an engine via a damper; and
   a controller programmed to
   measure a speed of the electric machine,
   generate a torque command based on a difference between the measured electric machine speed and a commanded electric machine speed,
   filter a frequency content of the torque command to remove a resonant frequency of the engine, damper and electric machine, and
   issue the filtered command to the electric machine.

2. The vehicle of claim 1 wherein the controller implements a notch filter or a lead filter.

3. The vehicle of claim 2 wherein the controller further implements a speed controller and wherein the notch filter or lead filter is arranged to process outputs from the speed controller.

4. The vehicle of claim 3 wherein the speed controller has a gain such that the torque command includes the frequency content corresponding to the resonant frequency of the engine, damper and electric machine.

5. A method comprising:
   in response to a speed or torque command for an electric machine, filtering a frequency content of the command corresponding to a resonant frequency of a powertrain system including an engine, damper and the electric machine to reduce vibration of the powertrain system while the engine is generating power.

6. The method of claim 5 wherein the frequency content corresponding to the resonant frequency of the powertrain system causes torque and speed oscillations of the powertrain system.

7. A powertrain system comprising:
   an electric machine mechanically coupled with an engine via a damper; and
   at least one controller programmed to
   generate a torque command based on a measured electric machine speed and a commanded electric machine speed, wherein the torque command is filtered to remove a resonant frequency of the powertrain system, and
   while the engine is generating power, issue the torque command to the electric machine.

8. The powertrain system of claim 7 wherein the resonant frequency of the powertrain system causes torque and speed oscillations of the engine, damper and electric machine when the engine is mechanically coupled with the electric machine.

9. The powertrain system of claim 7 wherein the at least one controller implements a notch filter or a lead filter.

10. The powertrain system of claim 9 wherein the at least one controller further implements a speed controller and wherein the notch filter or lead filter is arranged to process outputs from the speed controller.

11. The powertrain system of claim 10 wherein the speed controller has a gain such that the torque command includes a frequency content corresponding to the resonant frequency of the powertrain system.

12. The powertrain system of claim 9 wherein the at least one controller further implements a speed controller and wherein the speed controller is arranged to process outputs from the notch filter or lead filter.

* * * * *